United States Patent

Pollard, Jr.

[15] 3,635,137
[45] Jan. 18, 1972

[54] CAMERA WITH DRUM SUPPORTED FILM STRIP

[72] Inventor: Melville R. Pollard, Jr., 19930 Fair Street, Woodland Hills, Calif. 91364

[73] Assignees: Stanley A. Ceplius, Garden Grove; Edward Tanner, Northridge; Mellville R. Pollard, Jr., Woodland Hills, Calif., part interest to each

[22] Filed: Sept. 2, 1970

[21] Appl. No.: 69,027

[52] U.S. Cl. ................................................95/11 R, 95/38
[51] Int. Cl. .........................................................G03b 19/02
[58] Field of Search.................................95/11 R, 12.2, 38

[56] References Cited

UNITED STATES PATENTS 1,984,420  12/1934  Moulin et al............................95/12.2

Primary Examiner—John M. Horan
Assistant Examiner—Kenneth C. Hutchinson
Attorney—White, Haefliger and Bachand

[57] ABSTRACT

A camera of simple construction, well adapted to film loading at a central processing station, employs a rotary drum the periphery of which defines a circular sequence of flats over which the film strip may be extended, the film and drum being rotatable in the camera case, and the film being urged against the flat which is associated with the film section in position to receive light admitted to the camera interior, for field flatness.

10 Claims, 6 Drawing Figures

PATENTED JAN 18 1972
3,635,137
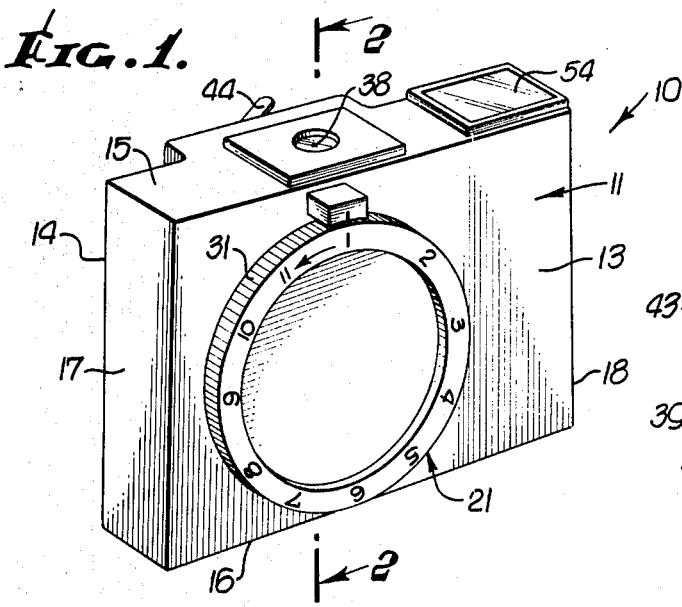
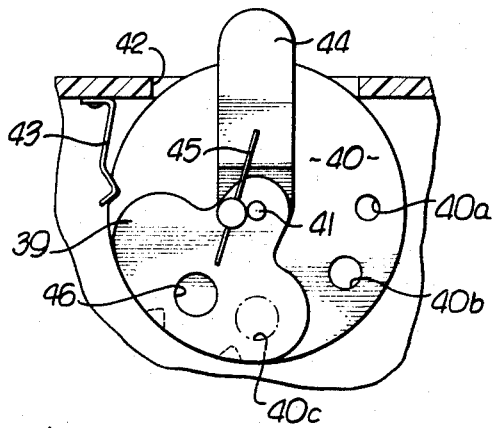
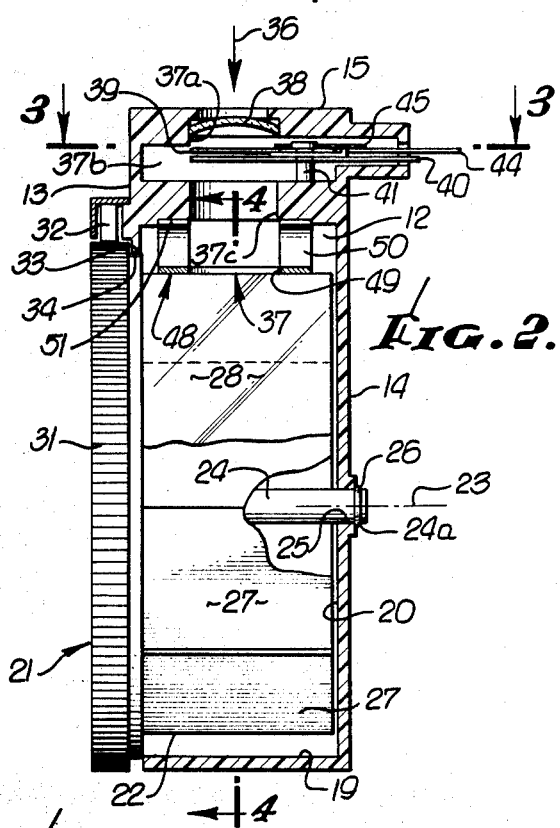
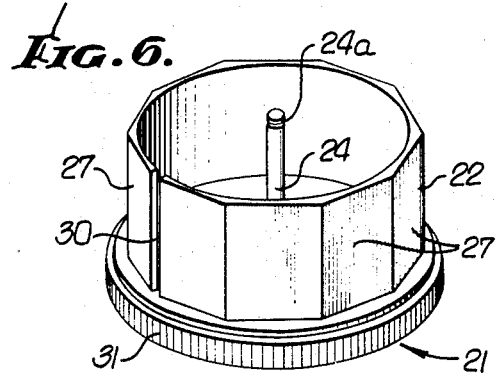
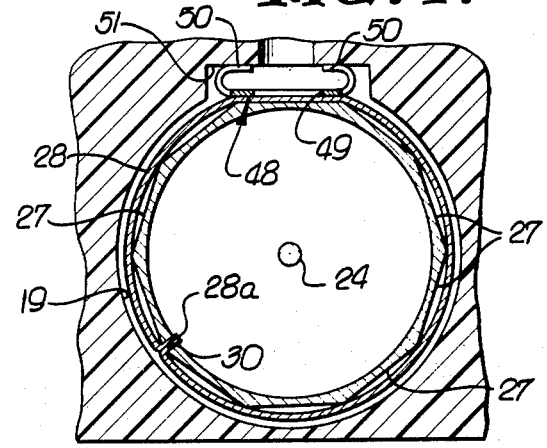
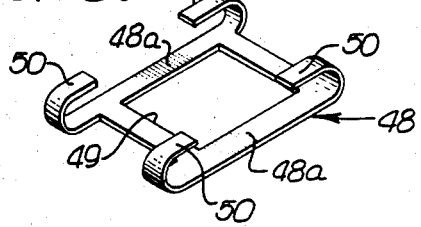
INVENTOR.
MELVILLE R. POLLARD, JR.
By White, Haefliger & Bachand
ATTORNEYS.

CAMERA WITH DRUM SUPPORTED FILM STRIP

BACKGROUND OF THE INVENTION

This invention relates generally to photography, and more particularly concerns simplified camera construction affording unusual advantages in usage as will appear.

There is a need for cameras of such simple construction as will enable their purchase at very low cost, and also permit economical transmission of the camera containing exposed film to a central processor for film development and return along with prints and a reloaded camera. While efforts have been made to meet this need such efforts have not to my knowledge resulted in the provision of a suitable camera, primarily due to lack of sufficiently simple construction which also enables accurate and precise exposure of the film. Thus, in none of U.S. Pat. Nos. 2,531,652; 2,513,740; 2,521,743; 2,633,065; and 2,930,280 is there a drum provided with a series of flat surfaces providing field flatness, in the manner described herein. In prior devices the film would be in focus at only one point on a horizontal plane along the curved surface of the drum. To provide focus over the entire field, a special highly corrective lens would have to be introduced into the optical system, which would compromise picture quality. Also, cost would be prohibitive for a small consumer camera.

More specifically, prior film holding and advancing devices have not possessed the unusual advantages afforded by the present invention.

SUMMARY OF THE INVENTION

It is a major object of the invention to provide a camera construction which will meet the needs and overcome the disadvantages referred to. Basically, the camera comprises, in combination, a case defining a chamber; a rotor having a drum portion received in the chamber, the drum periphery defining a circular sequence of flats over which a camera film strip may be extended to be rotated in the chamber with the drum; a passage defined by the case to pass light onto a selected section of the film strip brought into alignment with the passage; and, holder means for urging the film strip against the flat associated with the film section in alignment with the passage. As will be seen, the holder means may comprise a detent element carried by the case to yieldably resist free rotation of the drum, and thereby accurately position the flattened film section for exposure, by force transmission via the film strip to the drum, whereby multiple functions are performed by very simple apparatus.

Other objects and advantages include the provision of the detent element in the form of a plate forming an aperture to pass light to the film section in alignment with the passage; the provision of film extended over the flats and having opposite ends locally anchored as will appear; provision for drum removable reception axially laterally into the case chamber, and retention therein; the provision of a rotor flange projecting exteriorly of the chamber with indicia corresponding to location of the flats on the drum to indicate which film section is in alignment with the light-passing passage in the case; and other advantageous features of construction as will be seen.

These and other objects and advantages of the invention, as well as the details of an illustrative embodiment, will be more fully understood from the following detailed description of the drawings, in which:

DRAWING DESCRIPTION

FIG. 1 is a perspective showing of a camera incorporating the invention;

FIG. 2 is an enlarged vertical section taken on lines 2—2 of FIG. 1;

FIG. 3 is a horizontal section taken on lines 3—3 of FIG. 2;

FIG. 4 is a reduced vertical section taken on line 4—4 of FIG. 2;

FIG. 5 is a perspective showing of film holder means, and

FIG. 6 is a perspective showing of a rotor including a film drum.

DETAILED DESCRIPTION

In the drawings, the camera 10 includes a case 11 defining an interior chamber 12, which may be generally cylindrical. The case may, for example, have block form with opposed faces 13 and 14, sidewalls 15 and 16 and end walls 17 and 18, and the chamber 12 is shown to extend into the case from face 13 and to be defined by cylindrical interior wall 19 and flat inner wall 20.

A rotor 21 is carried by the case and includes a drum portion 22 defining an axis 23 and received axially into the chamber through the entrance provided at the face 13. Means to mount the rotor to rotate within the chamber may include a shaft 24 carried by the rotor and receivable into a bore 25 providing a bearing for shaft and rotor rotation about axis 23, with the outer surface of the drum spaced from the chamber wall 19. In addition, retention means to releasably retain the rotor drum fully inserted into the chamber may include the snap or o-ring 26 releasably fitting over a grooved projecting terminal 24a of the shaft. A rotor annular step shoulder 33 may interfit annular bore 34, for aiding centering of drum 22 and providing a light seal.

The drum periphery defines a circular sequence or series of flats 27 over which unexposed camera film 28 may be wound or extended as better seen in FIG. 4. Further, means to anchor the strip on the drum may include an axial slot 30 cut in the drum to loosely receive opposite end portions 28a of the film strip, for holding the film in the configuration illustrated. Accordingly, the film strip may be rotated in the chamber on the drum portion 22, in response to rotor rotation.

Such rotation may be effected manually by grasping the rotor flange portion 31 projecting exteriorly of the chamber as shown. In this regard, the flange may engage the face 13 of the case, as shown in FIG. 2, to limit insertion of the drum portion into the chamber. Flange portion 31 may be peripherally serrated for ratcheting engagement by flat spring 32 carried by the case in housed condition and deflected in such a manner as to block reverse (clockwise in FIG. 1) rotation of the rotor. Also, flange 31 bears indicia corresponding to the flats to indicate the association of the flats with film sections being progressively advanced into alignment with a light beam, to be described.

The case 11 also contains a passage to pass light entering at 36 from the case exterior for shutter controlled incidence on successive sections of the film strip brought into alignment with the passage in response to drum rotation. As seen in FIG. 2, the passage may have a section 37a containing lens 38, and enlarged section 37b containing a shutter 39 and stop plate or disc 40, and interior section 37c.

Plate 40 contains a series of apertures 40a-c of different sizes and spaced about the axis of a shaft 41 carried by the case to mount the plate for rotation against suitable resistance. Such rotation, as may be effected manually due to exposure of the plate edge through an opening 42 in the case, serves to shift a selected aperture into alignment with the beam, to control the amount of light passing to the film. Suitable detenting of the plate may be provided, as indicated at 43 in FIG. 3.

Shutter 39 is also carried by mounting shaft 41 for snap-rotation, as controlled by a lever 44 also carried by the shaft. When the lever is deflected, a spring 45 is tensioned to pass overcenter relative to the axis of shaft 41 and thereby snap the shutter displacing an aperture 46 in the latter momentarily across the aperture in plate 40 to pass light to the film. Spring 45 is connected between the shutter and lever 44, as shown.

In accordance with an important aspect of the invention, holder means is provided for urging the film strip against the flat associated with the film section in alignment with the light-passing passage 37, whereby accurate focusing of a light-defined image in the flat film plane is achieved. Such holder means may, with unusual advantage, comprise a detent element carried by the case to yieldable resist free rotation of the drum 22 by force transmission via the film strip to the drum, whereby dual functions are performed by the simple detent element provided. In the example, the detent element comprises a pressure plate 48 bearing against the film and having an aperture 49 to pass light to the film section in alignment with the passage 37. Plate 48 may have legs 50 which are curved as shown to bear against a case inner wall 51 and with spring deflection to generate light spring force transmitted to the film and drum flat for producing the film flattening and drum detenting functions referred to. Such drum positioning holds the film section in exact flat position for proper image focusing. Note that only those portions of the film at opposite sides of the film area to be exposed are engaged by the narrow sections 48a of the plate.

Due to the very simple construction of the camera, it is well adapted to quantity production at low cost, as by forming the case and rotor of molded plastic material. Such cameras, preloaded with film, may then be sold at popular prices, used once, and mailed to a film processor who may develop the film and prints and mail the latter along with a reloaded camera to the user, all at minimum cost and trouble. These advantages flow from the unusually surprisingly simple and effective construction of the camera.

Finally, a view finder window and associated lenses 54 may be incorporated in the camera, as seen in FIG. 1.

I claim:
1. In a camera, the combination comprising
   a. a case defining a chamber,
   b. a rotor having a drum portion received in said chamber, the drum periphery defining a circular sequence of flats over which a camera film strip may be extended to be rotated in the chamber with said rotor drum portion,
   c. the case containing a passage to pass light from the case exterior onto a selected section of the film strip brought into alignment with said passage in response to drum rotation, and
   d. holder means for urging the film strip against the flat associated with the film section in alignment with said passage.

2. The combination of claim 1 including said film extended over said flats.

3. The combination of claim 1 wherein said drum portion carries means to anchor the film strip thereon.

4. The combination of claim 1 wherein said drum portion of the rotor is removably received axially into the chamber, and including retaining means releasably retaining the drum portion in said chamber.

5. The combination of claim 4 wherein the rotor includes a manually rotatable portion projecting exteriorly of the chamber, and exteriorly visible indicia on the rotor corresponding to said flats to indicate the association of the flats with film sections being progressively advanced into alignment with said passage.

6. The combination of claim 5 wherein said manually rotatable portion comprises a rotor flange overlapping the side of the case bordering said chamber.

7. The combination of claim 1 wherein said holder means comprises a detent element carried by the case to yieldably resist free rotation of the drum portion by force transmission via the film strip to the drum portion.

8. The combination of claim 7 wherein said element includes a plate to transmit said force and which forms an aperture to pass light to the film section in alignment with said passage.

9. The combination of claim 1 including a view finder carried by the case in radially outwardly spaced relation to said chamber.

10. The combination of claim 1 including a rotary plate containing light-passing apertures selectively shiftable into alignment with said passage, and a shutter movable to control light passage through the aperture in alignment with said passage, the plate and shutter being presented for manual control thereof.

* * * * *